United States Patent
Kaloust et al.

(10) Patent No.: US 9,567,005 B1
(45) Date of Patent: *Feb. 14, 2017

(54) MULTI-MODE SKID STEERING

(71) Applicant: Lockheed Martin Corporation, Bethesda, MD (US)

(72) Inventors: Joseph H. Kaloust, Bedford, TX (US); Wendell H. Chun, Lone Tree, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 236 days.

This patent is subject to a terminal disclaimer.

(21) Appl. No.: 14/463,762

(22) Filed: Aug. 20, 2014

Related U.S. Application Data

(60) Division of application No. 11/530,129, filed on Sep. 8, 2006, now Pat. No. 8,839,891, which is a
(Continued)

(51) Int. Cl.
*B62D 11/00* (2006.01)
*B62D 1/28* (2006.01)
(Continued)

(52) U.S. Cl.
CPC ......... *B62D 11/001* (2013.01); *B60G 17/0162* (2013.01); *B62D 1/283* (2013.01);
(Continued)

(58) Field of Classification Search
CPC ............. B62D 1/283; B62D 6/00; B62D 6/12; B62D 11/001; B62D 11/003; B60G 17/0162
See application file for complete search history.

(56) References Cited

U.S. PATENT DOCUMENTS

| 1,041,837 A | 10/1912 | Miks |
| 1,202,203 A | 10/1916 | Moench |

(Continued)

FOREIGN PATENT DOCUMENTS

| CH | 295771 A | 1/1954 |
| EP | 872665 A1 | 10/1998 |

(Continued)

OTHER PUBLICATIONS

Non-final Office Action for U.S. Appl. No. 11/530,129 mailed Mar. 31, 2009, 5 pages.
(Continued)

*Primary Examiner* — Joseph Rocca
*Assistant Examiner* — Maurice Williams
(74) *Attorney, Agent, or Firm* — Withrow & Terranova, PLLC

(57) ABSTRACT

A method includes operating a wheeled vehicle including an articulated suspension system; and articulating the suspension system to skid steer the vehicle. A wheeled vehicle having an articulated suspension system includes a skid steering controller capable of articulating the suspension system to skid steer the vehicle. The skid steering controller may be implemented in software and may, but does not necessarily, include three stages for applying a differential torque, varying the traction of at least one wheel, and finely adjusting the wheel's suspension to approach a critical damped response of the vehicle turning rate with respect to its commanded rate, respectively.

18 Claims, 9 Drawing Sheets

Related U.S. Application Data continuation-in-part of application No. 10/784,739, filed on Feb. 23, 2004, now abandoned, and a continuation-in-part of application No. 10/639,278, filed on Aug. 12, 2003, now abandoned.

(60) Provisional application No. 60/449,271, filed on Feb. 21, 2003, provisional application No. 60/449,271, filed on Feb. 21, 2003.

(51) Int. Cl.
   *B62D 6/00* (2006.01)
   *B62D 61/10* (2006.01)
   *B62D 61/12* (2006.01)
   *B60G 17/016* (2006.01)

(52) U.S. Cl.
   CPC .............. *B62D 6/00* (2013.01); *B62D 11/003* (2013.01); *B62D 61/12* (2013.01); *B62D 61/10* (2013.01)

(56) References Cited

U.S. PATENT DOCUMENTS

| | | |
|---|---|---|
| 1,567,684 A | 12/1925 | Srakula |
| 1,783,995 A | 12/1930 | Berg |
| 2,748,879 A | 6/1956 | Bailey |
| 3,145,796 A | 8/1964 | Padula |
| 3,167,147 A | 1/1965 | Symons et al. |
| 3,397,896 A | 8/1968 | Willetts |
| 3,409,100 A | 11/1968 | Kronqvist |
| 3,513,927 A | 5/1970 | Kozowyk et al. |
| 3,566,825 A | 3/1971 | Ruf |
| 3,584,892 A | 6/1971 | Moore |
| 3,649,981 A | 3/1972 | Woodworth |
| 3,666,036 A | 5/1972 | Scerbo |
| 3,727,710 A * | 4/1973 | Sanders .............. B62D 11/08 180/6.7 |
| 3,730,287 A | 5/1973 | Fletcher et al. |
| 3,806,141 A | 4/1974 | Janer |
| 3,842,926 A | 10/1974 | Williams et al. |
| 4,021,690 A | 5/1977 | Burton |
| 4,049,070 A | 9/1977 | Soyland |
| 4,056,158 A | 11/1977 | Ross |
| 4,162,713 A | 7/1979 | Heitman et al. |
| 4,176,726 A | 12/1979 | Schaeff |
| 4,291,779 A | 9/1981 | Mann et al. |
| 4,313,511 A | 2/1982 | Soo Hoo |
| 4,325,443 A * | 4/1982 | Fischer .............. B62D 55/08 180/22 |
| 4,334,590 A | 6/1982 | Plumb |
| 4,342,278 A | 8/1982 | Horan |
| 4,491,207 A | 1/1985 | Boonchanta et al. |
| 4,555,126 A | 11/1985 | Ishimitsu et al. |
| 4,572,311 A * | 2/1986 | Oswald .............. B60K 7/0007 180/24.05 |
| 4,600,069 A | 7/1986 | Oswald et al. |
| 4,702,843 A | 10/1987 | Oswald et al. |
| 4,709,265 A | 11/1987 | Silverman et al. |
| 4,720,120 A | 1/1988 | Shimatani et al. |
| 4,721,177 A | 1/1988 | Qizhen |
| 4,721,328 A | 1/1988 | Chauveau et al. |
| 4,771,848 A | 9/1988 | Namba et al. |
| 4,799,564 A | 1/1989 | Iijima et al. |
| 4,805,102 A | 2/1989 | Ise et al. |
| 4,836,342 A | 6/1989 | Wolfe |
| 4,850,786 A * | 7/1989 | Oswald .............. B66C 19/007 180/208 |
| 4,898,257 A | 2/1990 | Brandstadter |
| 4,921,272 A | 5/1990 | Ivers |
| 4,957,307 A | 9/1990 | Gandiglio |
| 4,967,362 A * | 10/1990 | Schutten .............. A01B 69/008 56/10.2 F |
| 4,977,971 A | 12/1990 | Crane, III et al. |
| 4,994,970 A | 2/1991 | Noji et al. |
| 5,005,658 A | 4/1991 | Bares et al. |
| 5,014,800 A | 5/1991 | Kawamoto et al. |
| 5,022,812 A | 6/1991 | Coughlan et al. |
| 5,033,573 A | 7/1991 | Hrovat |
| 5,037,125 A | 8/1991 | Zamitter et al. |
| 5,076,378 A | 12/1991 | Lagace |
| 5,087,229 A | 2/1992 | Hewko et al. |
| 5,137,101 A | 8/1992 | Schaeff |
| 5,180,180 A | 1/1993 | Yamashita et al. |
| 5,201,836 A | 4/1993 | DeWitt |
| 5,203,646 A | 4/1993 | Landsberger et al. |
| 5,248,008 A | 9/1993 | Clar |
| 5,276,623 A | 1/1994 | Wolfe |
| 5,277,281 A | 1/1994 | Carlson et al. |
| 5,316,100 A | 5/1994 | Juan |
| 5,350,033 A | 9/1994 | Kraft |
| 5,372,211 A | 12/1994 | Wilcox et al. |
| 5,382,854 A | 1/1995 | Kawamoto et al. |
| 5,405,181 A | 4/1995 | Watkins et al. |
| 5,440,916 A | 8/1995 | Stone et al. |
| 5,443,354 A | 8/1995 | Stone et al. |
| 5,451,135 A | 9/1995 | Schempf et al. |
| 5,474,504 A | 12/1995 | Bay et al. |
| 5,515,934 A | 5/1996 | Davis |
| 5,517,414 A | 5/1996 | Hrovat |
| 5,519,611 A | 5/1996 | Tagawa et al. |
| 5,525,115 A | 6/1996 | Vanzini |
| 5,528,978 A | 6/1996 | Forster |
| 5,549,837 A | 8/1996 | Ginder et al. |
| 5,581,136 A | 12/1996 | Li |
| 5,652,704 A | 7/1997 | Catanzarite |
| 5,672,044 A | 9/1997 | Lemelson |
| 5,693,004 A | 12/1997 | Carlson et al. |
| 5,711,746 A | 1/1998 | Carlson |
| 5,733,218 A | 3/1998 | Sudau et al. |
| 5,762,407 A | 6/1998 | Stacey et al. |
| 5,762,466 A | 6/1998 | Fraser |
| 5,816,372 A | 10/1998 | Carlson et al. |
| 5,819,870 A | 10/1998 | Braun |
| 5,823,309 A | 10/1998 | Gopalswamy et al. |
| 5,842,547 A | 12/1998 | Carlson et al. |
| 5,845,753 A | 12/1998 | Bansbach |
| 5,896,965 A | 4/1999 | Gopalswamy et al. |
| 5,900,184 A | 5/1999 | Weiss et al. |
| 5,906,249 A | 5/1999 | Monkkonen |
| 5,910,745 A * | 6/1999 | Zarabadi .............. G06G 7/164 327/356 |
| 5,947,238 A | 9/1999 | Jolly et al. |
| 5,993,358 A | 11/1999 | Gureghian et al. |
| 5,999,868 A | 12/1999 | Beno et al. |
| 6,010,139 A | 1/2000 | Heyring et al. |
| 6,092,011 A | 7/2000 | Hiramoto |
| 6,095,295 A | 8/2000 | Park et al. |
| 6,095,486 A | 8/2000 | Ivers et al. |
| 6,112,843 A | 9/2000 | Wilcox et al. |
| 6,113,343 A | 9/2000 | Goldenberg et al. |
| 6,123,027 A | 9/2000 | Suyama et al. |
| 6,131,709 A | 10/2000 | Jolly et al. |
| 6,151,930 A | 11/2000 | Carlson |
| 6,157,879 A | 12/2000 | Kwack et al. |
| 6,161,639 A | 12/2000 | Jones |
| 6,199,654 B1 | 3/2001 | Kojo et al. |
| 6,208,920 B1 | 3/2001 | Izawa et al. |
| 6,267,196 B1 | 7/2001 | Wilcox et al. |
| 6,276,475 B1 | 8/2001 | Nakanosono |
| 6,293,561 B1 | 9/2001 | Goetzen et al. |
| 6,293,562 B1 | 9/2001 | Kutscher |
| 6,318,522 B1 | 11/2001 | Johnston et al. |
| 6,360,148 B1 | 3/2002 | Halpin |
| 6,481,806 B1 | 11/2002 | Krueger et al. |
| 6,526,342 B1 | 2/2003 | Burdock et al. |
| 6,585,066 B1 | 7/2003 | Koneda et al. |
| 6,607,049 B2 | 8/2003 | Cigal |
| 6,622,074 B1 | 9/2003 | Coelingh et al. |
| 6,711,482 B2 | 3/2004 | Shiino et al. |
| 6,722,459 B1 | 4/2004 | Wendl et al. |
| 6,804,594 B1 | 10/2004 | Chen et al. |
| 6,816,753 B2 | 11/2004 | Sakamoto et al. |

(56) References Cited

U.S. PATENT DOCUMENTS

| | | |
|---|---|---|
| 6,816,764 B2 | 11/2004 | Coelingh et al. |
| 6,852,061 B2 | 2/2005 | Schoon |
| 6,859,702 B2 | 2/2005 | Kawashima et al. |
| 6,866,465 B2 | 3/2005 | Jester et al. |
| 6,942,049 B2 | 9/2005 | Shimizu |
| 7,150,340 B2 | 12/2006 | Beck et al. |
| 7,261,176 B2 | 8/2007 | Chun et al. |
| 7,464,775 B2 | 12/2008 | Clemens et al. |
| 8,550,192 B2 | 10/2013 | Clemens et al. |
| 8,672,065 B2 | 3/2014 | Beck et al. |
| 8,839,891 B2 | 9/2014 | Kaloust et al. |
| 2002/0084599 A1 | 7/2002 | Charaudeau et al. |
| 2003/0001734 A1 | 1/2003 | Schofield et al. |
| 2003/0033063 A1 | 2/2003 | Kawashima et al. |
| 2003/0125859 A1 | 7/2003 | Dix et al. |
| 2003/0150663 A1 | 8/2003 | Farbotnik et al. |
| 2003/0205424 A1 | 11/2003 | Felsing et al. |
| 2004/0046335 A1 | 3/2004 | Knox et al. |
| 2004/0109750 A1 | 6/2004 | Klassen |
| 2004/0163863 A1 | 8/2004 | Beck et al. |
| 2004/0163869 A1 | 8/2004 | Chun et al. |
| 2004/0164505 A1 | 8/2004 | Clemens et al. |
| 2004/0167682 A1 | 8/2004 | Beck et al. |
| 2004/0231904 A1 | 11/2004 | Beck et al. |
| 2004/0232632 A1 | 11/2004 | Beck et al. |
| 2004/0239055 A1 | 12/2004 | Bender |
| 2005/0145428 A1 | 7/2005 | Chun et al. |
| 2006/0082077 A1 | 4/2006 | Gouriet et al. |
| 2006/0138732 A1 | 6/2006 | Buma et al. |
| 2007/0040341 A1 | 2/2007 | Kaloust et al. |
| 2007/0080001 A1 | 4/2007 | Beck et al. |
| 2007/0084664 A1 | 4/2007 | Beck et al. |
| 2009/0020351 A1 | 1/2009 | Chun et al. |
| 2009/0033045 A1 | 2/2009 | Clemens et al. |

FOREIGN PATENT DOCUMENTS

| | | |
|---|---|---|
| GB | 2382638 A | 6/2003 |
| JP | 62251220 | 11/1987 |
| JP | 2262484 | 10/1990 |
| JP | 8169345 | 7/1996 |
| KR | 1020060034211 A | 4/2006 |
| TW | I299706 B | 8/2008 |
| WO | 9401181 A | 1/1994 |
| WO | 0153145 A1 | 7/2001 |
| WO | 2005039956 A2 | 5/2005 |
| WO | 2005039956 A3 | 5/2005 |

OTHER PUBLICATIONS

Final Office Action for U.S. Appl. No. 11/530,129 mailed Nov. 27, 2009, 6 pages.
Non-final Office Action for U.S. Appl. No. 11/530,129 mailed Mar. 1, 2010, 8 pages.
Final Office Action for U.S. Appl. No. 11/530,129 mailed Oct. 6, 2010, 6 pages.
Advisory Action for U.S. Appl. No. 11/530,129 mailed Jan. 6, 2011, 2 pages.
Examiner's Answer to the Appeal Brief for U.S. Appl. No. 11/530,129 mailed Jun. 24, 2011, 8 pages.
Non-final Office Action for U.S. Appl. No. 11/530,129 mailed Aug. 7, 2013, 6 pages.
Final Office Action for U.S. Appl. No. 11/530,129 mailed Feb. 26, 2014, 8 pages.
Notice of Allowance for U.S. Appl. No. 11/530,129 mailed May 21, 2014, 5 pages.
Non-Final Office Action for U.S. Appl. No. 11/559,988, mailed Feb. 6, 2009, 7 pages.
Non-Final Office Action for U.S. Appl. No. 11/559,988, mailed Aug. 28, 2009, 8 pages.
Notice of Allowance for U.S. Appl. No. 11/559,988, mailed Feb. 16, 2010, 4 pages.
Non-Final Office Action for U.S. Appl. No. 12/180,905, mailed Feb. 26, 2009, 9 pages.
Final Office Action for U.S. Appl. No. 12/180,905, mailed Jun. 2, 2010, 9 pages.
Advisory Action for U.S. Appl. No. 12/180,905, mailed Aug. 11, 2010, 3 pages.
Non-Final Office Action for U.S. Appl. No. 12/180,905, mailed Dec. 7, 2010, 11 pages.
Final Office Action for U.S. Appl. No. 12/180,905, mailed Nov. 7, 2011, 12 pages.
Examiner's Answer to the Appeal Brief for U.S. Appl. No. 12/180,905, mailed Nov. 9, 2012, 6 pages.
Non-Final Office Action for U.S. Appl. No. 12/207,210, mailed Apr. 28, 2009, 11 pages.
Final Office Action for U.S. Appl. No. 12/207,210, mailed Oct. 29, 2009, 13 pages.
Examiner's Answer to the Appeal Brief for U.S. Appl. No. 12/207,210, mailed Jul. 19, 2010, 19 pages.
Notice of Allowance for U.S. Appl. No. 12/207,210, mailed May 31, 2013, 9 pages.
Office Action for European Patent Application No. 03818840.5, mailed Jul. 9, 2006, 6 pages.
Office Action for European Patent Application No. 03818840.5, mailed Aug. 29, 2007, 4 pages.
Summons to Attend Oral Proceedings for European Patent Application No. 03818840.5, mailed Feb. 13, 2009, 2 pages.
Office Action for European Patent Application No. 03818840.5, mailed Jun. 26, 2009, 6 pages.
Written Opinion for Singapore Patent Application No. 200505201-4, mailed May 9, 2008, 3 pages.
Examination Report for Singapore Patent Application No. 200505201-4, mailed Feb. 6, 2009, 4 pages.
Certificate of Grant of Patent for Singapore Patent Application No. 200505201-4, mailed Jul. 31, 2009, 1 page.
Office Action for Taiwanese Patent Application No. 093100360, mailed Apr. 13, 2007, 11 pages.
The Republic of China Patent Certification for Taiwanese Patent Application No. 093100360, mailed Aug. 11, 2008, 3 pages.
International Search Report for PCT/US03/38918, mailed May 7, 2004, 3 pages.
International Search Report for PCT/US03/41039, mailed Jun. 27, 2005, 8 pages.
Non-Final Office Action for U.S. Appl. No. 10/639,261, mailed Dec. 16, 2004, 6 pages.
Non-Final Office Action of U.S. Appl. No. 10/639,261, mailed May 13, 2005, 5 pages.
Non-Final Office Action of U.S. Appl. No. 10/639,261, mailed Oct. 4, 2005, 6 pages.
Non-Final Office Action for U.S. Appl. No. 10/639,261, mailed Jun. 9, 2006, 6 pages.
Final Office Action for U.S. Appl. No. 10/639,261, mailed Nov. 17, 2006, 7 pages.
Non-Final Office Action for U.S. Appl. No. 10/639,261, mailed Jun. 22, 2007, 10 pages.
Final Office Action for U.S. Appl. No. 10/639,261, mailed Jul. 8, 2008, 13 pages.
Notice of Allowance for U.S. Appl. No. 10/639,261, mailed Sep. 18, 2008, 6 pages.
Non-Final Office Action for U.S. Appl. No. 10/639,278, mailed Oct. 4, 2005, 8 pages.
Final Office Action for U.S. Appl. No. 10/639,278, mailed Jul. 5, 2006, 8 pages.
Non-Final Office Action for U.S. Appl. No. 10/639,279, mailed Sep. 14, 2005, 8 pages.
Final Office Action for U.S. Appl. No. 10/639,279, mailed Mar. 8, 2006, 10 pages.
Advisory Action for U.S. Appl. No. 10/639,279, mailed Jan. 22, 2007, 3 pages.
Examiner's Answer to the Appeal Brief for U.S. Appl. No. 10/639,279, mailed Feb. 13, 2007, 11 pages.
Examiner's Answer to the Appeal Brief for U.S. Appl. No. 10/639,279, mailed Apr. 2, 2007, 16 pages.

(56) References Cited

OTHER PUBLICATIONS

Decision on Appeal for U.S. Appl. No. 10/639,279, mailed May 27, 2008, 17 pages.
Non-Final Office Action for U.S. Appl. No. 10/784,341, mailed May 4, 2007, 6 pages.
Non-Final Office Action for U.S. Appl. No. 10/784,341, mailed Oct. 24, 2007, 7 pages.
Non-Final Office Action for U.S. Appl. No. 10/784,341, mailed Mar. 25, 2008, 2 pages.
Supplemental Non-Final Office Action for U.S. Appl. No. 10/784,341, mailed Mar. 31, 2008, 13 pages.
Final Office Action for U.S. Appl. No. 10/784,341, mailed Dec. 2, 2008, 12 pages.
Advisory Action for U.S. Appl. No. 10/784,341, mailed Feb. 26, 2009, 3 pages.
Pre-Brief Appeal Conference Decision for U.S. Appl. No. 10/784,341, mailed Apr. 6, 2009, 2 pages.
Examiner's Answer to the Appeal Brief for U.S. Appl. No. 10/784,341, mailed Oct. 29, 2009, 18 pages.
Decision on Appeal for U.S. Appl. No. 10/784,341, mailed Sep. 27, 2012, 9 pages.
Non-Final Office Action for U.S. Appl. No. 10/784,739, mailed Aug. 15, 2006, 9 pages.
Final Office Action for U.S. Appl. No. 10/784,739, mailed Mar. 15, 2007, 11 pages.
Advisory Action for U.S. Appl. No. 10/784,739, mailed May 25, 2007, 2 pages.
Non-Final Office Action for U.S. Appl. No. 10/784,739, mailed Jul. 9, 2007, 11 pages.
Final Office Action for U.S. Appl. No. 10/784,739, mailed Feb. 11, 2008, 12 pages.
Advisory Action for U.S. Appl. No. 10/784,739, mailed Apr. 22, 2008, 4 pages.
Advisory Action for U.S. Appl. No. 10/784,739, mailed May 19, 2008, 3 pages.
Examiner's Answer to Appeal Brief for U.S. Appl. No. 10/784,739, mailed Dec. 8, 2008, 14 pages.
Non-Final Rejection for U.S. Appl. No. 11/530,129, mailed Mar. 31, 2009, 5 pages.
Non-Final Office Action for U.S. Appl. No. 11/609,517 mailed Sep. 14, 2007, 10 pages.
Final Office Action for U.S. Appl. No. 11/609,517 mailed Apr. 2, 2008, 10 pages.
Examiner's Answer to the Appeal Brief for U.S. Appl. No. 11/609,517 mailed Jan. 12, 2009, 8 pages.
Examiner's Answer to the Appeal Brief for U.S. Appl. No. 11/609,517 mailed Nov. 24, 2009, 7 pages.
Notice of Allowance for U.S. Appl. No. 11/609,517 mailed May 23, 2013, 8 pages.

\* cited by examiner

MULTI-MODE SKID STEERING

This application is a divisional of co-pending U.S. patent application Ser. No. 11/530,129, filed on Sep. 8, 2006, entitled MULTI-MODE SKID STEERING; which is a continuation-in-part of U.S. patent application Ser. No. 10/784,739, filed on Feb. 23, 2004, entitled SYSTEM AND METHOD FOR ACTIVELY CONTROLLING TRACTION IN AN ARTICULATED VEHICLE, and of U.S. patent application Ser. No. 10/639,278, filed on Aug. 12, 2003, entitled VEHICLE HAVING AN ARTICULATED SUSPENSION AND METHOD OF USING SAME; each of which claims the benefit of U.S. Provisional Patent Application No. 60/449,271, filed on Feb. 21, 2003, entitled UNMANNED GROUND VEHICLE, the disclosures of each of which are hereby incorporated herein by reference in their entireties.

BACKGROUND OF THE INVENTION

1. Field of the Invention

The present invention relates to skid-steering a vehicle and, more particularly, to skid-steering a vehicle in three modes.

2. Description of the Related Art

Perhaps the most common and familiar steering techniques for wheeled ground vehicles is known as "Ackermann steering." In Ackermann steering, the wheels of the vehicle are turned relative to the heading of the vehicle. As the vehicle travels, the turned wheels turn the vehicle to a new course. However, other types of steering are known to the art. One "other" steering technique for ground vehicles is known as "skid steering." Most skid-steered, wheeled vehicles rely on differential torque to perform turn maneuvers. Tracking performance becomes more critical for unmanned ground vehicles as well as manned ground vehicles maneuvering in densely populated areas. However, differential torque control limits the turning performance of skid-steered wheeled vehicles. This is especially true if the terrain has a high value of surface coefficient of friction such as asphalt/concrete.

The present invention is directed to overcoming, or at least reducing, the effects of one or more of the problems set forth above.

SUMMARY OF THE INVENTION

The invention comprises a method and apparatus for use in skid steering a wheeled vehicle having an articulated suspension system. In one aspect, the method comprises operating a wheeled vehicle including an articulated suspension system; and articulating the suspension system to skid steer the vehicle. The method may be a computer-implemented method comprising receiving a turn command; and articulating the suspension system to skid steer the vehicle responsive to the turn command in another aspect. The method may comprise skid-steering the vehicle in multiple modes in yet another aspect.

In another aspect, a vehicle, comprises a plurality of wheels; an articulated suspension system by which the wheels are mounted to the vehicle; and a skid steering controller capable of articulating the suspension system to skid steer the vehicle. In yet another aspect, the skid steering controller comprises a processor; a bus system; a storage communicating with the processor over the bus system; a software application residing on the storage that, when invoked by the processor, is capable of articulating a suspension system of a vehicle to skid steer the vehicle. In another aspect, the skid steer controller comprises three stages. A first stage is capable of applying a differential torque to each side of a vehicle. A second stage is capable of varying the traction of at least one wheel contacting the ground surface. And, a third stage is capable of finely adjusting the wheel's suspension to approach a critical damped response of the vehicle turning rate with respect to its commanded rate. In another aspect, a program storage medium is encoded with instructions that, when executed by a computing device, perform a method comprising articulating a suspension system of a vehicle to skid steer the vehicle.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

Figure 1A:
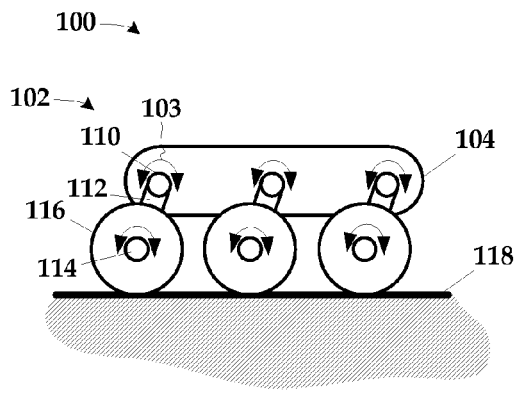
FIG. 1A-FIG. 1C are stylized, side elevational, end elevational, and top plan views, respectively, of an illustrative embodiment of a vehicle according to the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present invention pertains to actively controlling the traction of a ground vehicle, and, more particularly, to actively controlling the traction of an unmanned ground vehicle having an articulated suspension (i.e., an "articulated vehicle"). The embodiments illustrated herein correspond to unmanned ground combat vehicles, but the invention is not so limited. Indeed, some aspects of the invention are not limited even to unmanned ground vehicles, but may be applied to any ground vehicle. The design of a particular embodiment of an unmanned, ground vehicle will first be discussed, followed by a discussion of a tri-mode skid steering controller operating in the context of the vehicle.

Figure 1B:
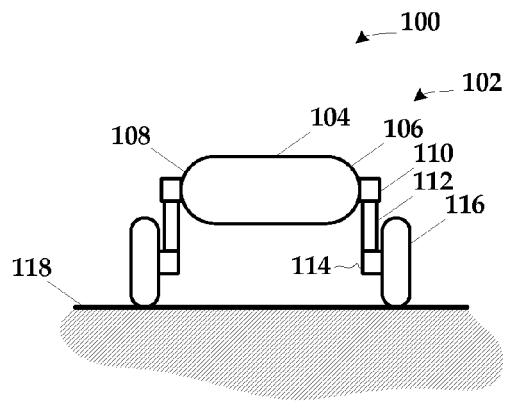
Figure 1C:
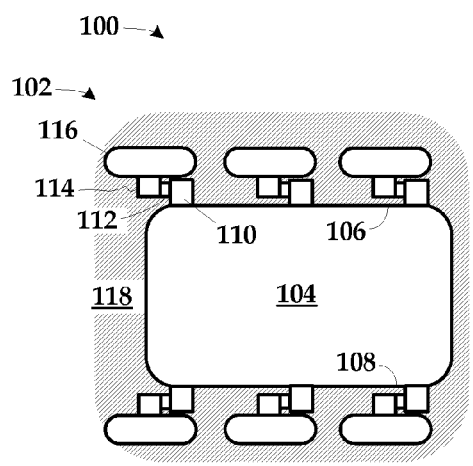

FIG. 1A-FIG. 1C are side and end elevational views and a top plan view, respectively, of an illustrative embodiment of a vehicle 100 such as may be used in implementing some embodiments of the present invention. The vehicle 100 is a wheeled, vehicle with an articulated suspension system. The vehicle is skid-steered and has a variable suspension ride height. The construction and operation of this particular vehicle 100 is more fully disclosed and claimed in U.S. application Ser. No. 10/639,278, filed Aug. 12, 2003. However, to further an understanding of the present invention, selected portions of will now be reproduced with slight modification.

The vehicle 100 comprises a plurality of wheel assemblies 102 (only one indicated) articulated with a chassis 104. In the illustrated embodiment, each of the plurality of wheel assemblies 102 is rotationally articulated with the chassis 104, as indicated by arrows 103 (only one indicated). The wheel assemblies 102, when attached to the chassis 104 and operated as disclosed below, implement an articulated suspension system for the vehicle 100. Each of the wheel assemblies 102 comprises a suspension arm 112, a wheel 116 rotatable with respect to the suspension arm 112, and a hub drive 114 for rotating the wheel 116.

The vehicle 100 includes six wheel assemblies 102. The present invention, however, is not limited to a vehicle (e.g., the vehicle 100) having six wheel assemblies 102. In general, the number of wheel assemblies 102 is not material to the practice of the present invention. However, the approach of the present invention means that, as a practical matter, an embodiment will have at least six wheel assemblies 102.

The arrangement of the wheel assemblies 102 need not necessarily be bilaterally symmetrical along the longitudinal axis of the vehicle 100 as shown. Some embodiments may employ different numbers of wheel assemblies 102 on different sides 106, 108 of the vehicle 100, for example. The wheel assemblies 102 also may differ in their location on the respective sides of the vehicle 100, for another example.

The chassis 104 is illustrated in FIG. 1A-FIG. 1C and others in a stylized fashion and, thus, corresponds to any chosen type of chassis 104 for the vehicle 100. For example, the chassis 104 may have a configuration capable of carrying cargo or personnel, capable of deploying armaments, adapted for reconnaissance tasks, or capable of assisting dismounted personnel to traverse an obstacle to their progress. The invention is not limited by the style, construction, or end use of the chassis 104.

Still referring to FIG. 1A-FIG. 1C, each of the wheel assemblies 102 is independently articulated by a respective one of a plurality of driven shoulder joints 110. The shoulder joint of the illustrated embodiment is more fully disclosed and claimed in U.S. application Ser. No. 10/639,281, entitled, "Articulated Vehicle Suspension System Shoulder Joint," and filed Aug. 12, 2003, in the name of Wendell H. Chun, et al. This application is hereby expressly incorporated by reference for all purposes as if set forth verbatim herein. When a particular shoulder joint 110 is articulated, the wheel assembly 102 coupled therewith is rotated with respect to the chassis 104.

The shoulder joints 110 may be driven by independent drives (i.e., not mechanically linked to each other) or two or more of the shoulder joints 110 may be driven by components of a power transmission system (e.g., a geartrain with clutched power take-offs) capable of operating each of the shoulder joints 110 independently. The shoulder joints 110 may each be driven by the same type of drive or they may be driven by different types of drives. In alternative embodiments, some of the shoulder joints may operate in tandem—i.e., with common rotation.

Each of the wheel assemblies 102 may be independently moved, via its shoulder joint 110, to any desired rotational position with respect to the chassis 104 at a chosen speed. For example, each of the wheel assemblies 102 may be moved from a starting rotational position (e.g., a "zero" or "home" rotational position) to a rotational position of 45° clockwise, to a rotational position of 380° counterclockwise, or to any other desired rotational position.

Each of the wheel assemblies 102 comprises the shoulder joint 110, the suspension arm 112, the hub drive 114, and a wheel 116, as discussed above. Each of the suspension arms 112 is articulated with the chassis 104 by its shoulder joint 110. Further, each of the wheels 116 is mounted to and rotates with respect to its suspension arm 112 via its hub drive 114, which is capable of selectively rotating the wheel 116 (as indicated by arrows 117) at a chosen speed. Each of the drives 114 may comprise any type of drive known to the art, for example, a direct-drive motor, a servo motor, a motor-driven gear train, an engine-driven gear train, a rotary actuator, or the like. Further, each of the drives 114 may be of the same type or they may comprise different types of drives. By actuating some or all of the drives 114 at the same or different speeds, the vehicle 100 may be propelled across a surface 118 along a chosen path.

The hub drive 114 is capable of rotating the wheel 108 (each shown in FIG. 1A-FIG. 1C) in either direction in the illustrated embodiment. The rotational direction of the transmission 104 may be changed by changing the rotational direction of the motor 102. The rotational direction of the motor 102 may be changed by techniques known to the art depending upon the type of motor used. Changing the rotational direction of the motor 102 and, thus, the rotational direction of the hub drive 101, may also be used to brake the hub drive 101 by using the motor 102 as a generator to develop negative "braking" torque. For example, if the hub drive 101 is rotating in a first direction and the motor 102 is switched such that it is urged to rotate in a second direction, the motor 102 will be "backdriven" to brake the hub drive 101.

The hub drive 114 is furthermore capable of rotating the wheel 108 in either direction in a low speed mode or a high speed mode. The hub drive 114 is also capable of braking while rotating in either direction in the low speed mode or the high speed mode. Still further, by placing the hub drive 114 in a park mode, the hub drive 114 is inhibited from rotating and, thus, no additional "parking brake" is required. Yet further, by placing the hub drive 114 in a neutral mode, the wheel 108 may rotate freely, irrespective of the rotation of the motor.

Vibrations or other undesirable motions induced into the vehicle 100 by rough terrain over which the vehicle 100 travels may be dampened by the mechanical compliance of the wheels 116. In other words, the positions of the wheel assemblies 100 deform to absorb the shock forces resulting from traveling over rough terrain. Such shock forces may be absorbed by optional shock absorbers, spring elements, and/or dampers, such as those known to the art. In the illustrated embodiment, the shock absorption is performed by a rotary damper more fully disclosed and claimed in U.S. application Ser. No. 10/371,785, entitled, "Magnetorheological Rotary Damper," and filed Feb. 21, 2003, in the name of Eric N. Anderfaas. This application is hereby expressly incorporated by reference for all purposes as if set forth verbatim herein.

Figure 2:
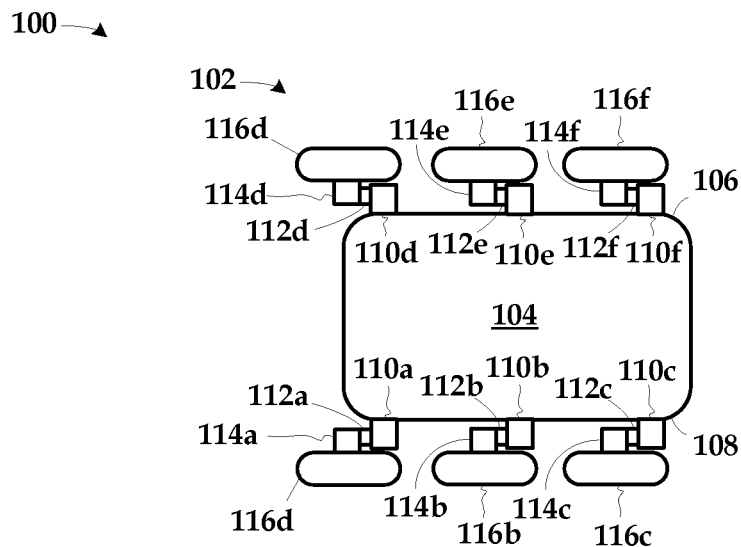
FIG. 2 is a stylized, top plan view of the vehicle of FIG. 1A-FIG. 1C in which the wheel assemblies of the vehicle are separately identified for purposes of the subsequent discussion.

FIG. 2 is a stylized, top plan view of the vehicle of FIG. 1A-FIG. 1C in which the wheel assemblies of the vehicle are separately identified for purposes of the subsequent discussion. More particularly, in this and following figures, the wheel assemblies 102 and the wheels 116 of FIG. 1A-FIG. 1C are labeled 102a-102f and 116a-116f, respectively, for clarity in describing the operation of the vehicle 100.

Figure 3:
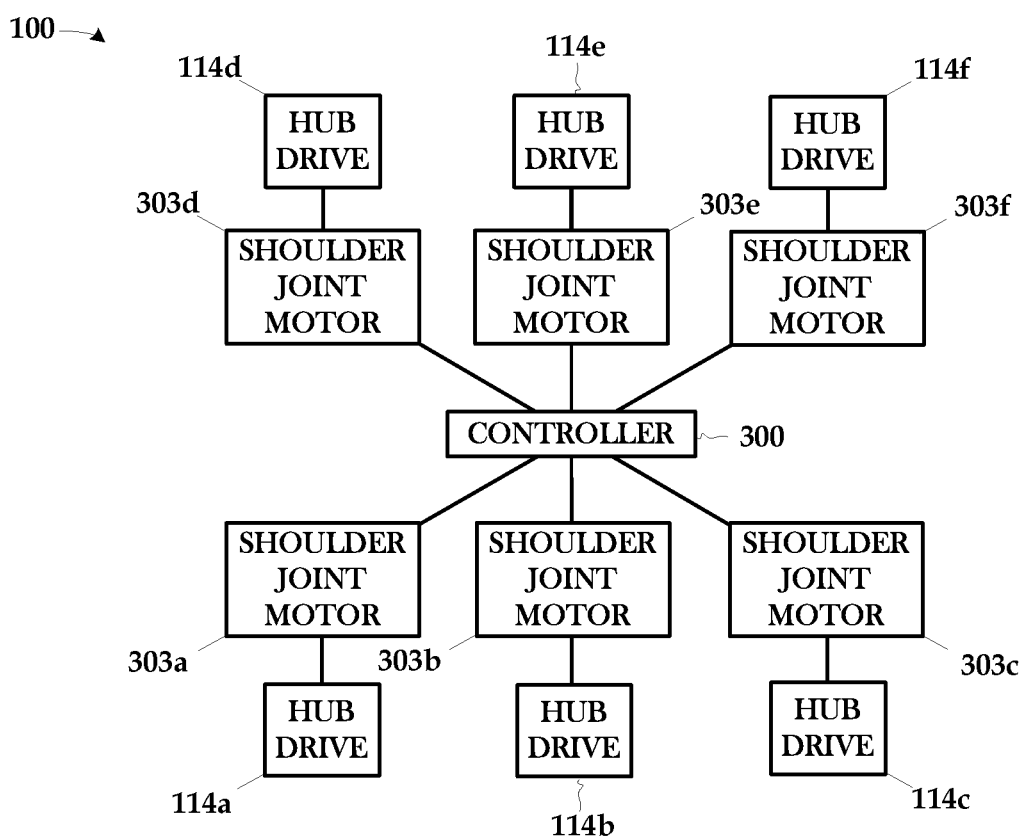
FIG. 3 is a block diagram of selected portions of the command and control architecture of the vehicle shown in FIG. 1A-FIG. 1C relevant to the present invention.

The vehicle 100 also includes a controller 300, shown in FIG. 3 that senses the state of the vehicle 100 and controls its turning responsive to a turn command. The controller 300 sends operational commands to effect a commanded turn. In the illustrated embodiment, the controller 300 sends operational commands to the hub drives 114a-114f and the shoulder joint motors 303a-303f that drive the shoulder joints 110a-110f. The turn command is issued by guidance and navigation control ("GNC") system, not shown in FIG. 3. Guidance and navigation for unmanned vehicles is a matter of extensive study in the art. Accordingly many approaches and techniques are known to the art for these tasks. Any suitable approach and/or technique known to the art may be used.

Figure 4:
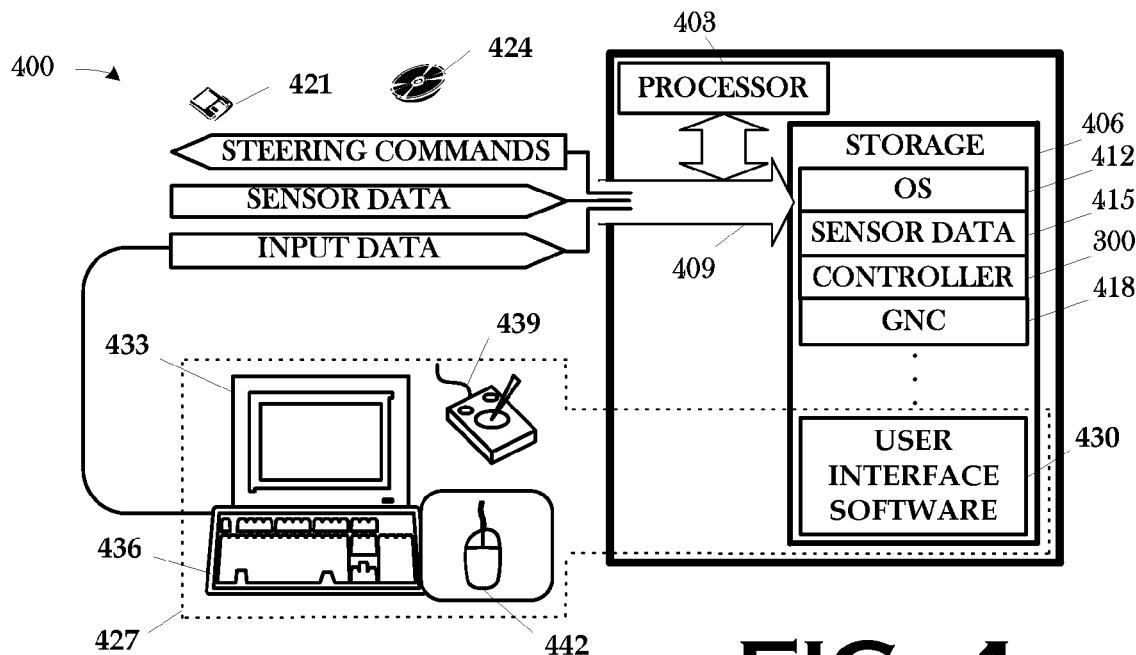
FIG. 4 depicts in a block diagram a computing apparatus such as may be used to implement certain aspects of the present invention in the vehicle of FIG. 1A-FIG. 1C.

The controller 300 is, in general, a non-linear controller using recursive techniques and may be implemented in either hardware or software. In the illustrated embodiment, it is implemented in software. FIG. 4 depicts selected portions of the hardware and software architecture of a computing apparatus 400 such as may be used in implementing some aspects of the present invention in a block diagram. The computing apparatus 400 includes a processor 403 communicating with storage 406 over a bus system 409. Each of these components will now be discussed in turn.

The processor 403 may be any suitable processor known to the art. In general, the controller 300 will handle a fair amount of data, some of which may be relatively voluminous by nature and which is processed quickly. Thus, certain types of processors may be more desirable than others for implementing the processor 403. For instance, a digital signal processor ("DSP") may be more desirable for the illustrated embodiment than will be a general purpose microprocessor. In some embodiments, the processor 403 may be implemented as a processor set, such as a microprocessor with a mathematics co-processor.

The storage 406 may be implemented in conventional fashion and may include a variety of types of storage, such as a hard disk and/or random access memory ("RAM"). The storage 406 will typically involve both read-only and writable memory implemented in disk storage and/or cache. Parts of the storage 406 will typically be implemented in magnetic media (e.g., magnetic tape or magnetic disk) while other parts may be implemented in optical media (e.g., optical disk). The present invention admits wide latitude in implementation of the storage 406 in various embodiments.

The storage 406 is also encoded with a variety of software components, including an operating system ("OS") 412, the sensor data 415, the controller 300, a GNC system 418. That is, these software components "reside" on the storage 406. The processor 403 runs under the control of the OS 412, which may be practically any operating system known to the art. The controller 300 receives the sensor data 415 from the sensors 103 (not shown) mentioned above and stores it on the storage 406. The sensor data 415 may be stored in any suitable type of data structure known to the art, such as first-in, first-out ("FIFO") queue.

As is apparent from the discussion herein, some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk 421 or a hard drive) or optical (e.g., an optical disk 424, such as a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Note that the GNC 418 and the controller 300 are shown as separate software components in FIG. 4. In this particular embodiment, they interact through conventional software interfaces using conventional techniques. However, the invention is not so limited. The invention admits variation with respect to the software architecture that is employed. For example, the GNC 418 and the controller 300 might comprise separate portions of a single software component in alternative embodiments. This and other suitable variations in the software architecture will become apparent to those skilled in the art having the benefit of this disclosure.

The computing apparatus 400 also includes a user interface 427. The user interface software 430 resides on the storage 310 and may be of any suitable, conventional software known to the art for this purpose. The user interface 427 also includes a display 433 and one or more peripheral I/O devices such as a keypad or keyboard 436, a mouse 439, or a joystick 442. The user interface 427 is optional and may be omitted in some alternative embodiments. The user interface 427 may also be present in some embodiments without being used in conjunction with the present invention.

In general, and still referring to FIG. 4, the GNC 418 and the controller 300 receive sensor data regarding the state of the vehicle 100. In this particular embodiment, the controller 300 also receives some manually entered input through the user interface 345 such as mission parameters and constant values associated with the vehicle 100 (e.g., its mass). In accordance with the mission profile, the GNC 418 guides and navigates the vehicle 100. At some point, the GNC 418 issues a turn command to the controller 300. The controller 300 then employs the present invention to implement the turn command.

Figure 5:
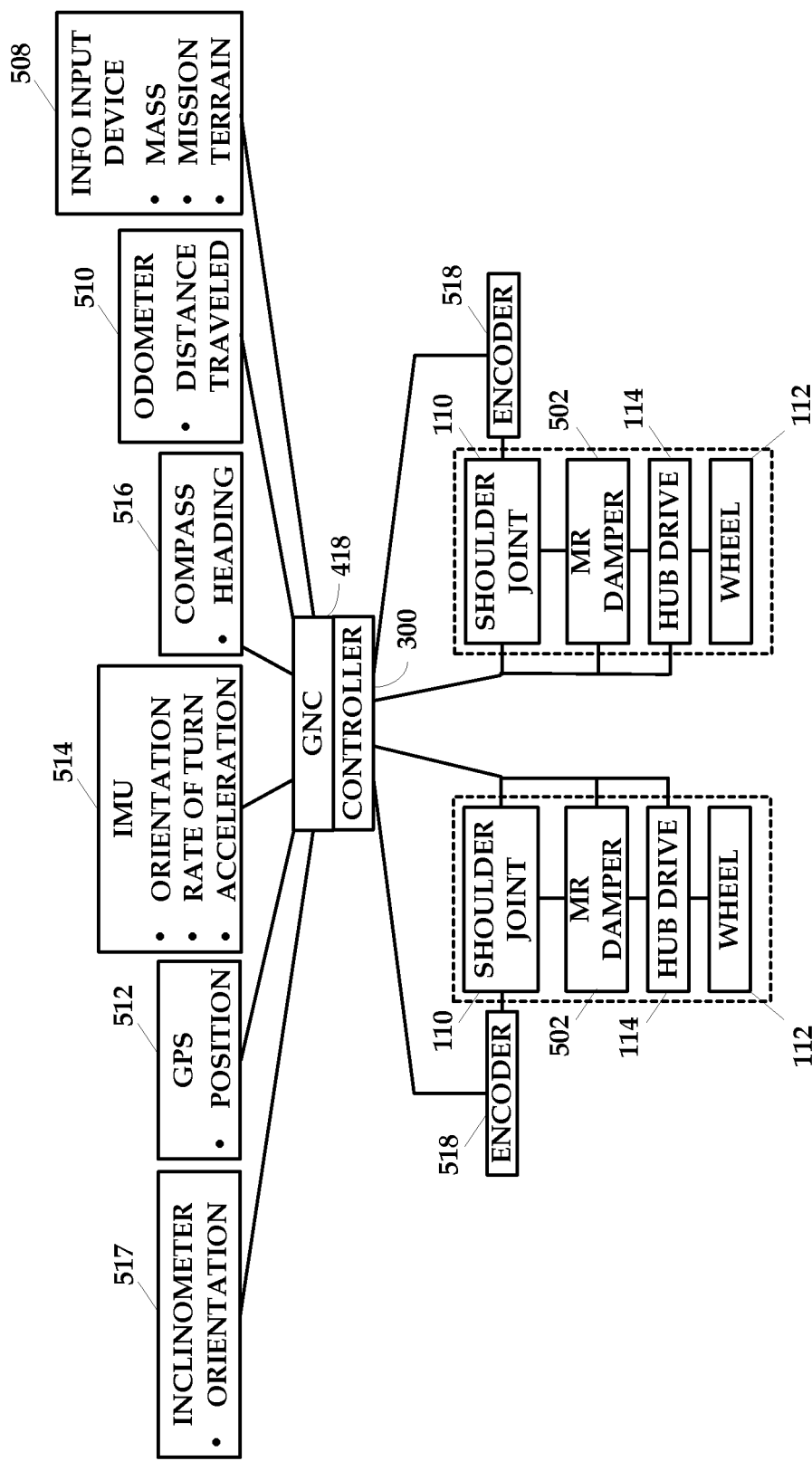
FIG. 5 is a stylized block diagram of an illustrative embodiment of a system for controlling traction in an articulated vehicle according to the present invention.

Data collection and steering command are better illustrated for the disclosed embodiment in a block diagram in FIG. 5. Note that, while the vehicle 100 may include any chosen number of wheel assemblies 102, FIG. 5 depicts only two wheel assemblies 102 for clarity and so as not to obscure the invention. The controller 300 is electrically coupled with each of the shoulder joints 110, rotary MR dampers 502, and hub drives 114 for monitoring and controlling the actions of these elements. For example, the controller 300 outputs to a particular hub drive 114 an electrical signal corresponding to the desired velocity of the hub drive 114 and receives therefrom a signal corresponding to the actual velocity of the hub drive 114 to control its rotational velocity.

An input device 508 (e.g., a user interface) allows vehicle mass, mission, terrain, and other information to be manually entered or downloaded to the controller 300. The controller 300 may comprise a single-board computer, a personal computer-type apparatus, or another computing apparatus known to the art. In one embodiment, the system 500 includes an odometer 510 that provides distance-traveled data to the controller 300. In this embodiment, the controller 300 is a combination of a proportional-integral-derivative ("PID") controller and a non-linear controller. The controller 300 is adapted to calculate the velocity and acceleration of the vehicle 100 based on data from the odometer 510. In other embodiments, the velocity and acceleration, if needed for controlling the attitude of the vehicle 100, may be provided by other means, such as by using data from a GPS receiver or an inertial measurement unit ("IMU"). Based on data provided by these sensors, the controller 300 effects control over the traction of the vehicle 100 according to the methods described above.

In the illustrated embodiment, the system 500 further includes a GPS receiver 512 adapted to provide the position of the vehicle 100 based on satellite triangulation to the controller 300. The system 500 may further include an IMU 514 for providing orientation, rate of turn, and/or acceleration data to the controller 300. In some embodiments, the IMU may be used as a redundant system for determining the location of the vehicle 100 in the case of failure of the GPS receiver 512. The illustrated embodiment also includes a compass 516 for providing heading information to the controller 300 and may include an inclinometer 517.

The vehicle 100 includes a plurality of encoders 518 corresponding to the plurality of wheel assemblies 102. The illustrated embodiment employs arm position encoders 518 to acquire data regarding, inter alia, the position of the arm 112 and the twist on the torsion bar (not shown) of the drives for the shoulder joints 110. From this data, the controller 300 can determine the arm speed, arm reaction torque, and estimated suspension load for the shoulder joint 110. Alternatively, resolvers or potentiometers may be used to measure for this information. Note that some embodiments may integrate a tachometer and calculate the same position data using simple calculus.

It will be appreciated by one of ordinary skill in the art having benefit of this disclosure that other means may be used to determine information needed to control the skid steering of the vehicle 100. Further, the scope of the present invention encompasses various embodiments wherein not every wheel assembly 102 of the vehicle 100 is controlled according to the skid steering control methodologies disclosed herein. While the embodiments disclosed herein are implemented in an electronic control system, other types of control systems are within the scope of the present invention.

Returning to FIG. 3, the controller 300 receives sensed data from the hub drives 114a-114f and the shoulder joint motors 303a-303f. The controller 300 also sends commands to the hub drives 114a-114f and the shoulder joint motors 303a-303f to drive the wheels 116a-116f and rotate the wheel assemblies 102 as described above. More particularly, in this particular embodiment, the control signals to the hub drives 114a-114f are routed through the respective shoulder joint motors 303a-303c. However, this is not necessary to the practice of the invention, and the signals may be routed to the hub drives 114a-114f and the shoulder joint motors 303a-303f in any convenient manner.

The controller 300 also sends commands to implement the skid-steering technique of the present invention as described further below. FIG. 6A-FIG. 6D illustrate the control logic 600 of the controller 300, first shown in FIG. 3, in the illustrated embodiment. FIG. 6A-FIG. 6D use conventional notation to present the control logic. Recall, however, that the controller 300 is software implemented in this particular embodiment although it may be implemented in hardware in alternative embodiments.

Referring now to FIG. 1A-FIG. 1C and FIG. 6A, the logic 600 of the skid-steering controller 300 is divided into three stages 601-603. In the first stage 601, a differential torque is applied to each side of the vehicle 100. In the second stage 602, the traction of each wheel 116 in contact with the surface 118 is varied in order to maximize and optimize the turning capability of the vehicle 100 by articulating the position of the suspension of the arms 112. In the third stage 603, the positions of the arms 112 are modified according to some input signals to insure an almost critical damped response of the vehicle turning rate with respect to its commanded rate. Note that any of these modes may also be used in conjunction with conventional Ackermann steering in alternative embodiments. In the illustrated embodiment, the vehicle 100 is not capable of Ackermann steering.

More particularly, the first stage 601 is basically a proportional-integral-derivative ("PID") controller. It receives the commanded turn rate 606 as input from the GNC 418, shown in FIG. 4. The actual turn rate 607 is determined by the controller 300 from operational characteristics of the vehicle 100 sensed as described above relative to FIG. 5.

Figure 6A:
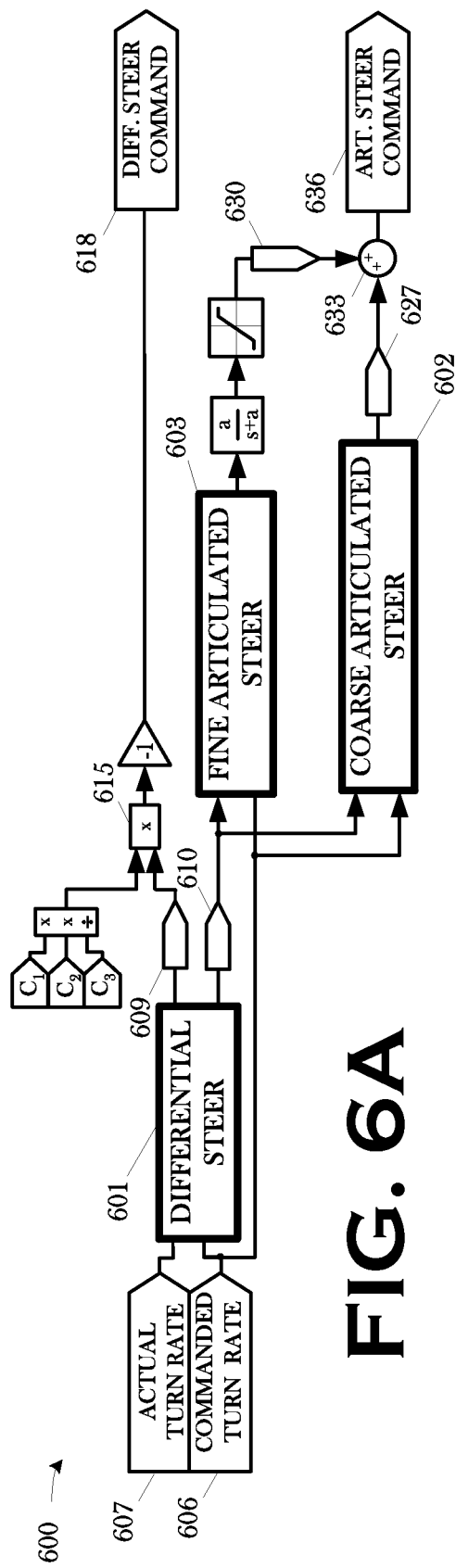
FIG. 6A-FIG. 6D are block diagrams of the control logic for the controller first shown in FIG. 3.
Figure 6B:
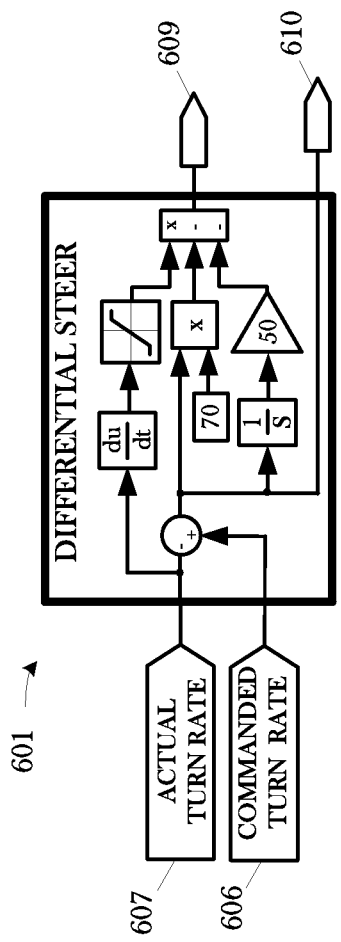

The first stage 601 produces two outputs 609-610, shown better in FIG. 6B. The output 609 represents the processed difference between the commanded and actual turn rates 606, 607. The output 609 is combined (at 615) with several pertinent constants $C_1$-$C_3$. The constants $C_1$-$C_3$ are typically quantities associated with characteristics of the vehicle 100 like vehicle mass, body inertia, and tire radius. These can be manually entered through the user interface 427, shown in FIG. 4. The combination is inverted and output to the vehicle 100 as described relative to FIG. 5 as the differential steer command 618. The output 610 represents the turn rate error, or the difference between the commanded and actual turn rates 606, 607. The output 610 is input to the second stage 603 for use in the fine articulation control.

Figure 6C:
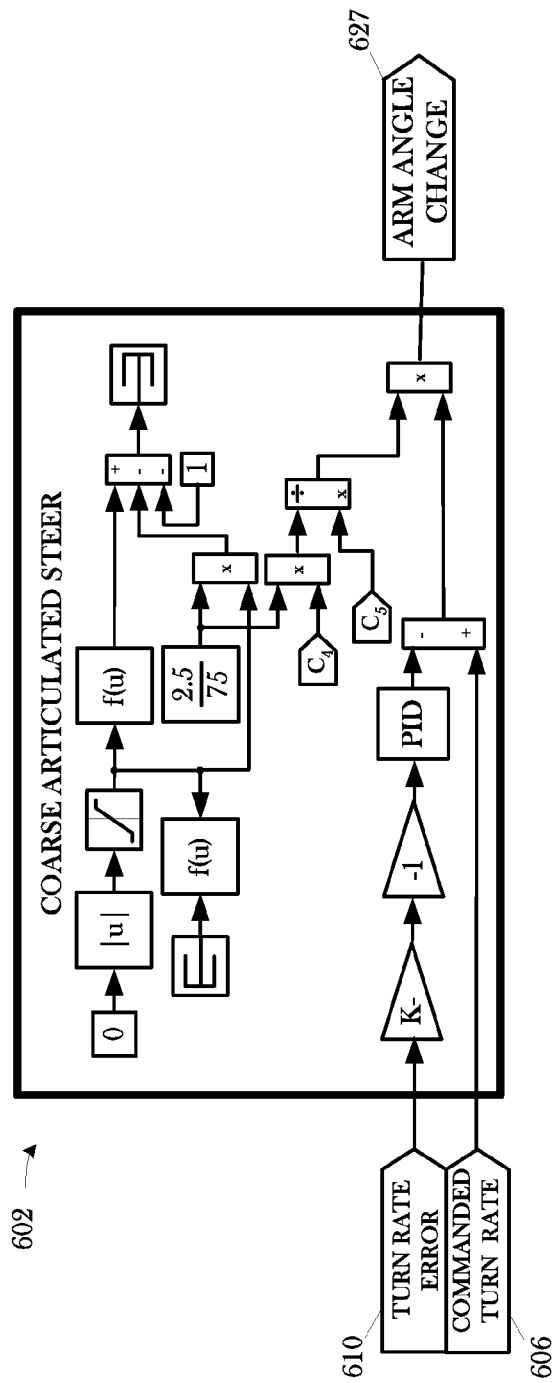

The second stage 602, as is shown in FIG. 6A and FIG. 6C, receives as input the commanded turn rate 606 and the output 610 (i.e., the turn rate error) from the first stage 601. The processing of the second stage 602 is shown in greater detail in FIG. 6C, and is basically a multiplexed PID. The second stage 602 outputs a coarse arm angle change 627.

Figure 6D:
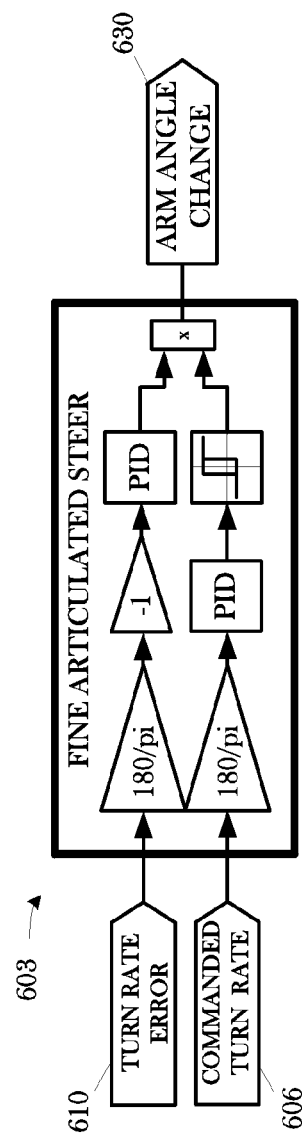

The third stage 603, as is shown in FIG. 6A and FIG. 6D, receives as input the commanded turn rate 606 and the output 610 (i.e., the turn rate error) of the first stage 601. These inputs are processed, shown better in FIG. 6D, to produce an output that is further processed to generate a fine arm angle change 630. As is shown in FIG. 6D, the third stage 603 is essentially a pair of multiplexed PIDs.

The coarse arm angle change 627 and the fine arm angle change 630 are then combined (at 633) to generate an articulating steer command 636. Through the combination, the fine arm angle change 630 operates on the coarse arm angle change 627 such that the resultant articulating steer command 636 produces an almost critical damped response of the vehicle turning rate with respect to its commanded rate. A "critical damped response" in one in which the commanded turn rate is achieved without undue oscillation of the articulation—i.e., rotation of the wheel assemblies 106—in the sense that it minimizes "overshooting" and "undershooting" the articulation.

Note that what constitutes "fine" and "coarse" articulation will vary not only by implementation and embodiment, but also by mission scenario. For example, depending on the mission scenario, a fine articulation may be 5° while in another that might constitute a coarse articulation. However, in general, a fine articulation may be considered one that is no more than approximately 10% of a coarse articulation.

The illustrated embodiment disclosed above employs all three stages 601-603, shown in FIG. 6A, and thus operates in all three modes. Furthermore, this particular embodiments runs all three modes in parallel, or at the same time. However, neither of these features is necessary to the practice of the invention. For example, some alternative embodiments may operate in less than all three modes. This can be accomplished, for example, by employing switches to switch out one of the three stages 601-603.

Figure 7:
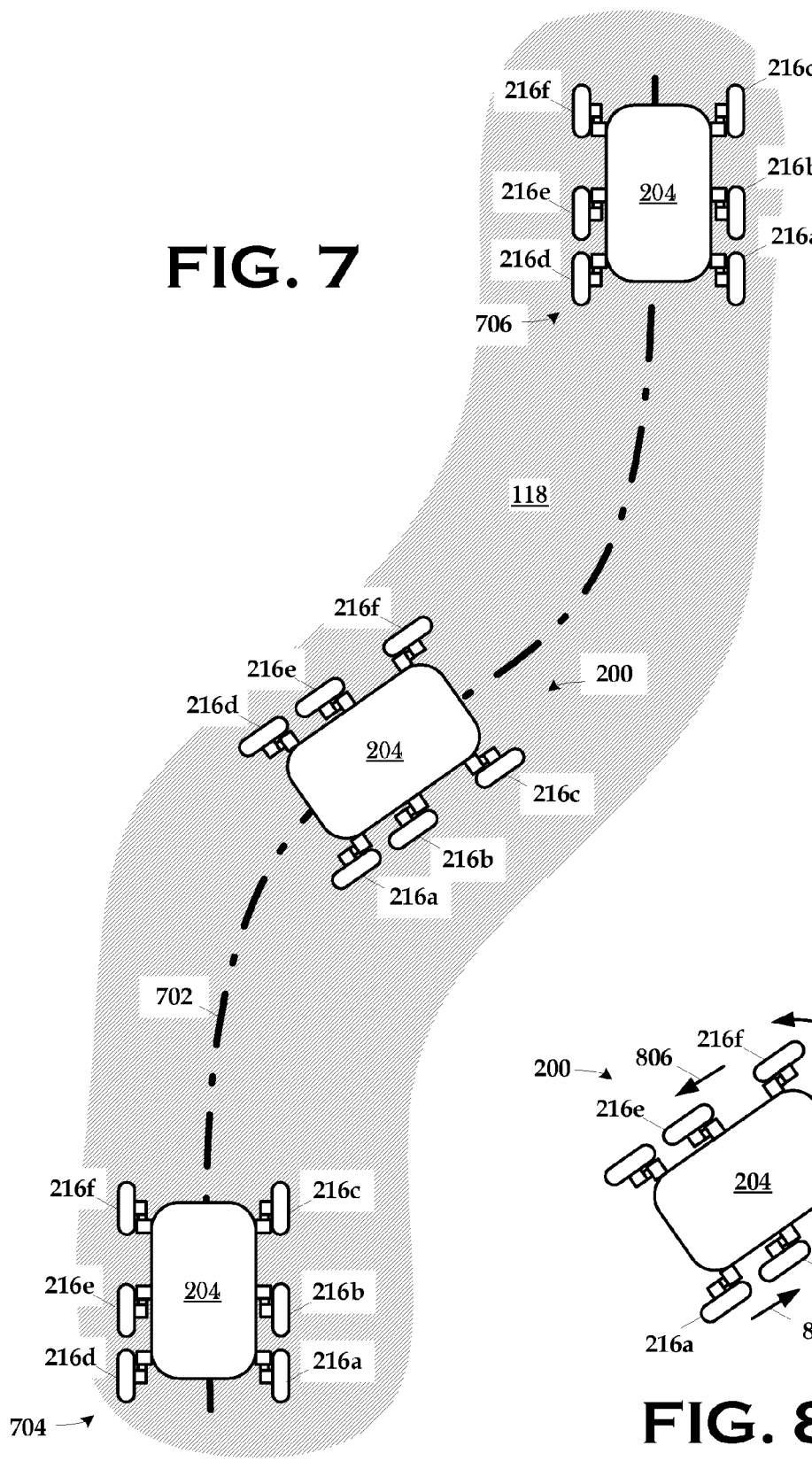
FIG. 7 is a stylized, top, plan view of the vehicle of FIG. 1A-FIG. 1C illustrating the movement thereof along a non-linear path in a first mode of operation.

FIG. 7 illustrates skid steering the vehicle 100 using a differential torque as controlled by the first stage 601. More particularly, the vehicle 100 may be skid steered along a particular path 702 by varying the rotational velocities of each of the wheels 116a-116f with respect to one another. For example, to traverse from a location generally at 704 to a location generally at 706, the velocity of the wheels 116d-116f is greater than the velocity of the wheels 116a-116c. The difference in velocity of the wheels 116d-116f as compared to the velocity of the wheels 116a-116c produces a right turn movement. To traverse from the location generally at 706 to a location generally at 708, the velocity of the wheels 116d-116f is less than the velocity of the wheels 116a-116c. This difference in velocity of the wheels 116d-116f as compared to the velocity of the wheels 116a-116c produces a left turn movement. In the illustrated embodiment, all of the wheels 116a-116f are generally in contact with the surface 118.

Figure 8:
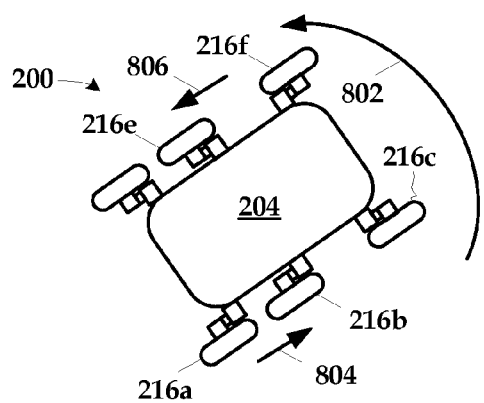
FIG. 8 is a stylized, top, plan view of the vehicle of FIG. 1A-FIG. 1C illustrating skid steering in the first mode of operation.

Further, as illustrated in FIG. 8, the vehicle 100 may turn or spin in place, as indicated by an arrow 802. To accomplish this maneuver, the wheels 116a-116c turn in a first direction, as indicated by an arrow 804, at a chosen speed and the wheels 116d-116f turn in a second direction that is counter to the first direction, as indicated by an arrow 806, at the chosen speed. The vehicle 100 may turn or spin in a direction counter to that indicated by the arrow 326 by reversing the directions of the wheels 116a-116c and 116d-116f.

Figure 9A:
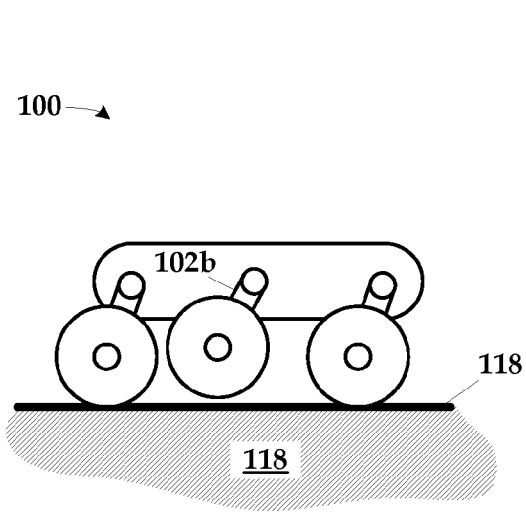
FIG. 9A-FIG. 9B illustrate the operation of the vehicle of FIG. 1A-FIG. 1C in the second and third modes.
Figure 9B:
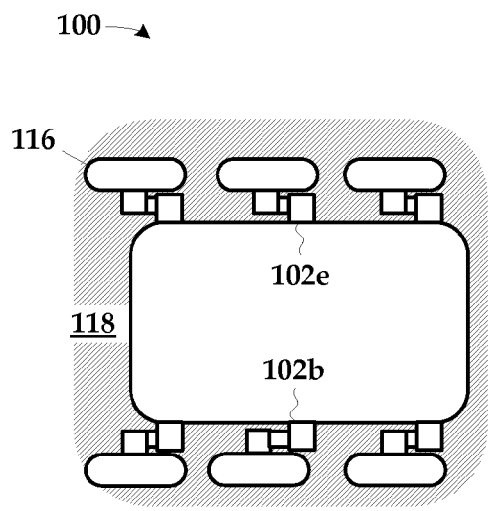

FIG. 9A-FIG. 9B illustrate skid steering of the vehicle 100 as controlled by the second and third stages 602-603 in the second and third modes of operation. More particularly, the controller 300 articulates the middle wheel assembly 102b by rotating it an amount determined as described above relative to FIG. 6A and FIG. 6C-FIG. 6D. The amount is represented by the output articulated steer command 636, shown in FIG. 6A.

The point of the articulation in the second and third modes is to control the degree of traction the vehicle 100 obtains from the wheel assemblies 102 to indirectly impart a differential torque in addition to the differential torque directly imparted by the first mode operation. Note that only the middle wheel assembly 102b is shown articulated relative to the other wheel assemblies 102. However, in some circumstances both middle wheel assemblies 102b and 112e may be articulated depending on factors such as the extremity of the commanded turn rate, the velocity of the vehicle, the constitution of the terrain, etc.

Also, the wheel assembly 102b is shown articulated upwardly, thereby decreasing the traction, and is shown rotated so that the wheel 116b no longer touches the ground. In some circumstances, the rotation may be downward to increase the traction. Furthermore, in some circumstances, the rotation may not be so great, i.e., the upward rotation may leave the wheel 116b contacting the ground. Since the middle wheel assembly 102e may be articulated in some circumstances, these considerations apply to its articulation, as well. Note that in some circumstances in which both the middle wheel assemblies 102b, 112e may be articulated, they may be articulated by different amounts.

Figure 10A:
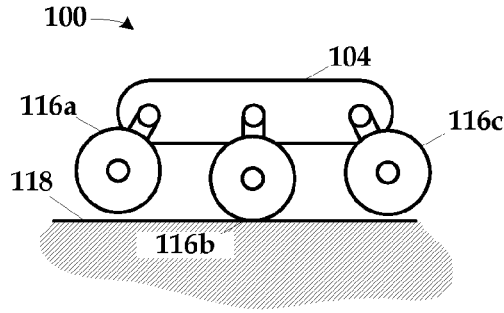
FIG. 10A-FIG. 10B are stylized side, elevational and top, plan views of the vehicle of FIG. 1A-FIG. 1C having wheel assemblies configured as outriggers.
Figure 10B:
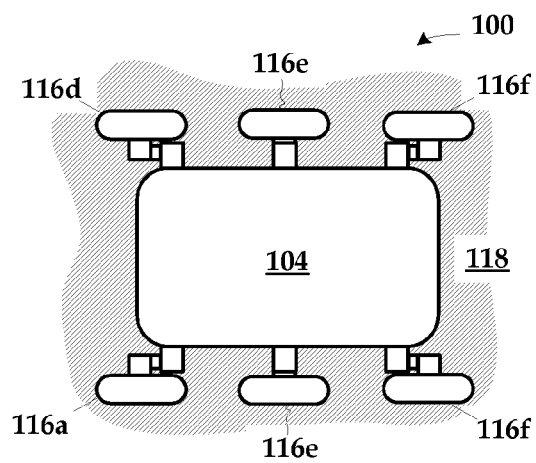

The above disclosure is expressed in terms of articulating the middle wheel assemblies 102b, 102e, but the invention is not so limited. Other wheel assemblies 102 may be articulated in other scenarios. For instance, it may be desirable in some situations for the vehicle 100 to be steered such that skidding of the wheels 116a-116f is lessened. Referring now to FIG. 10A-FIG. 10B, the wheels 116a, 116c, 116d, 116f are raised off the surface 118, such that the "footprint" of the vehicle is changed and primary support for the chassis 104 is provided by the wheels 116b, 116e. In this configuration, the wheels 116b, 116e are rotated to turn the vehicle 100, while the wheels 116a, 116c, 116d, 116f act as outriggers to stabilize the vehicle 100 during the turn.

Figure 11A:
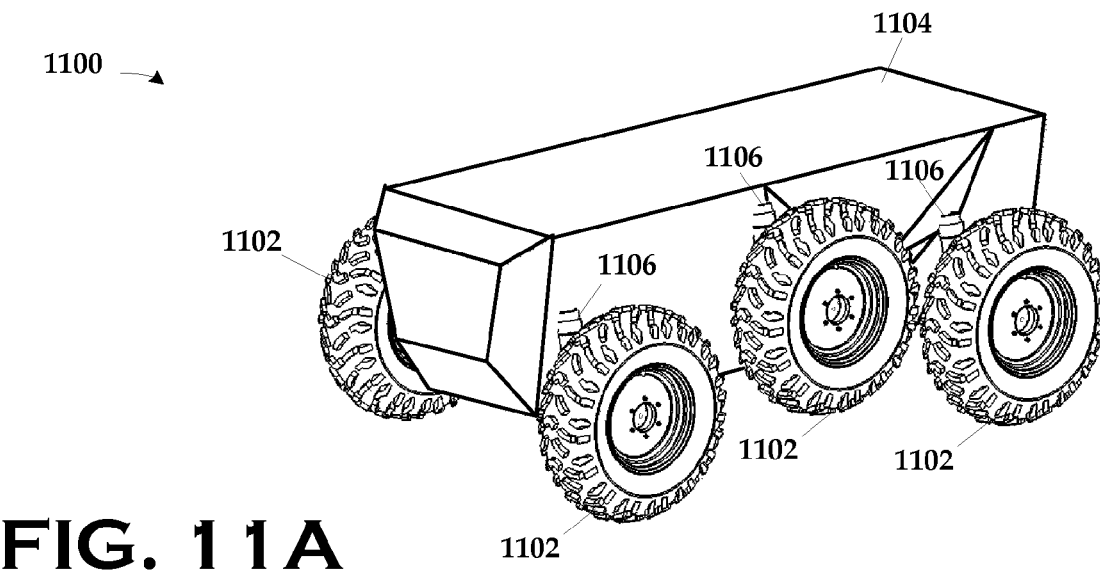
FIG. 11A-FIG. 11B are stylized views of a vehicle according to the present invention including a linearly articulable suspension.
Figure 11B:
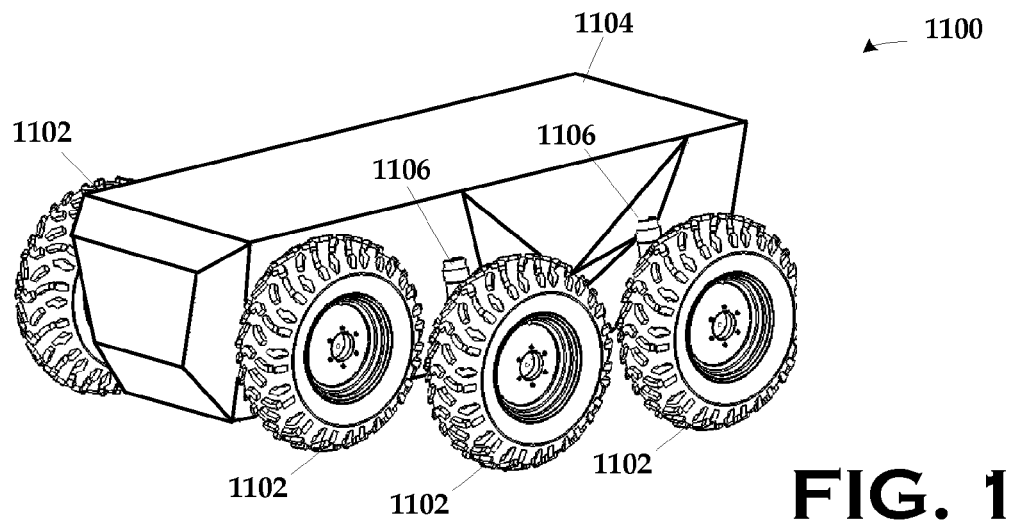

The vehicle 100 in the embodiment disclosed above uses a rotational articulation. Other articulations, however, are possible, such as linear articulations. For instance, FIG. 11A-FIG. 11B depict one particular embodiment of an articulated vehicle 1100 comprising a plurality of wheel assemblies 1102 (only four shown) that are each independently, linearly articulated (as indicated by arrow 1103) with respect to a chassis 1104 by an actuator 1106 (only three shown in FIG. 11A, only two shown in FIG. 11B). FIG.

11A-FIG. 11B illustrate only two of a multitude of articulated poses that the vehicle 1100 may take on. While the discussion below particularly relates to the vehicle 100, which employs rotational articulation, the present invention is not so limited. Rather, the scope of the present invention relates to a vehicle utilizing any type of articulation, as the embodiments of FIG. 1A-FIG. 1C and FIG. 11A-FIG. 11B are merely two of many types of articulated vehicles encompassed by the present invention.

As noted above, in order to perform and/or track a commanded speed and curvature (heading rate) successfully on various terrain types and variable vehicle payloads; one needs to insure that gains associated with the controller cover the whole region of operation of the vehicle. This means that gain scheduling tables should be used to maintain good performance of the vehicle on various terrain types. The multi-mode skid-steering controller disclosed and claimed herein minimizes the size of the gain scheduling tables that is usually associated with these types of gains. In addition, the controller adjusts the position of the middle arms to optimize the turning performance of the vehicle over a wide range of soil types. In other words, the proposed controller is a robust nonlinear type controller with minimum gain scheduling.

The present invention provides, for ground vehicles with an articulated suspension, dramatically improved turning capability of the vehicle under a wide range of surface and terrain types. This improved capability results from the ability of the present invention to blend differential steering with articulation of the suspension arms to enhance the turning performance of the vehicle.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A computer program product stored on a non-transitory computer-readable medium comprising instructions configured to cause at least one device to carry out the steps of:
    receiving sensor data regarding a state of a vehicle;
    receiving information associated with the vehicle;
    receiving a steer command that commands that a turn be performed at a commanded turn rate;
    determining an actual velocity of the vehicle and an actual turn rate of the vehicle; and
    sending an articulation signal to cause articulation of at least one wheel of the vehicle to implement skid steering, wherein the articulation signal is based upon at least one of the actual velocity of the vehicle and the actual turn rate of the vehicle.

2. The computer program product of claim 1, wherein the information includes information pertaining to at least one of vehicle mass, body inertia, tire radius, and a desired course of the vehicle.

3. The computer program product of claim 1, further comprising:
    comparing the actual turn rate of the vehicle with the commanded turn rate of the vehicle to determine a turn rate error.

4. The computer program product of claim 1, wherein sending the articulation signal to cause the articulation of the at least one wheel is performed in order to apply a differential torque to each of two sides of the vehicle to skid steer the vehicle.

5. The computer program product of claim 1, wherein the articulation of the at least one wheel includes an articulation of a suspension system to approach a critical damped response of the actual turn rate with respect to the commanded turn rate.

6. The computer program product of claim 1, wherein the articulation of the at least one wheel includes varying a height of the at least one wheel based on an aggregate of a coarse height adjustment based on a coarse height command and a fine height adjustment based on a fine height command.

7. The computer program product of claim 6, wherein the fine height adjustment is no more than approximately ten percent of the coarse height adjustment.

8. The computer program product of claim 6, wherein the fine height adjustment is no more than approximately five percent of the coarse height adjustment.

9. A skid steering controller, comprising:
    a processor;
    a bus system;
    a storage configured to communicate with the processor over the bus system; and
    a software application residing on the storage that, when invoked by the processor, is configured to articulate a suspension system of a vehicle to vary a height of at least one vehicle wheel with respect to a ground surface to skid steer the vehicle and to approach a critical damped response of a vehicle turning rate with respect to a commanded turning rate, wherein the height is varied based on an aggregate of a coarse height adjustment based on a coarse height command and a fine height adjustment based on a fine height command, wherein the fine height adjustment is no more than approximately ten percent of the coarse height adjustment.

10. The skid steering controller of claim 9, wherein the software application is further configured to apply a differential torque to each of two sides of the vehicle to skid steer the vehicle.

11. The skid steering controller of claim 9, wherein articulating the suspension system includes varying a traction of the at least one vehicle wheel responsive to a turn command.

12. A vehicle comprising:
    a chassis;
    a plurality of wheel assemblies;
    a suspension system, wherein the plurality of wheel assemblies is operably connected to the suspension system and the suspension system is configured to vary a height of one or more wheel assemblies with respect to a ground surface; and
    a skid steering controller configured to:
        receive sensor data regarding a state of the vehicle;
        receive information associated with the vehicle;
        receive a steer command that commands that a turn be performed at a commanded turn rate;
        determine an actual velocity of the vehicle and an actual turn rate of the vehicle; and
        send an articulation signal to cause articulation of at least one wheel assembly of the vehicle to implement skid steering, wherein the articulation signal is based upon at least one of the actual velocity of the vehicle and the actual turn rate of the vehicle.

13. The vehicle of claim 12, wherein the information includes information pertaining to at least one of vehicle mass, body inertia, tire radius, and a desired course of the vehicle.

14. The vehicle of claim 12, wherein the articulation signal is sent in order to apply a differential torque to each of two sides of the vehicle to skid steer the vehicle.

15. The vehicle of claim 12, wherein the articulation of the at least one wheel assembly includes articulating the suspension system to approach a critical damped response of the actual turn rate with respect to the commanded turn rate.

16. The vehicle of claim 12, wherein the articulation of the at least one wheel assembly includes varying a height of the at least one wheel assembly based on an aggregate of a coarse height adjustment based on a coarse height command and a fine height adjustment based on a fine height command.

17. The vehicle of claim 16, wherein the fine height adjustment is no more than approximately ten percent of the coarse height adjustment.

18. The vehicle of claim 16, wherein the fine height adjustment is no more than approximately five percent of the coarse height adjustment.

* * * * *